(12) United States Patent
Peake et al.

(10) Patent No.: US 9,766,083 B2
(45) Date of Patent: *Sep. 19, 2017

(54) METHOD AND SYSTEM FOR AUGMENTING A GUIDANCE SYSTEM WITH A PATH SENSOR

(71) Applicant: Trimble Navigation Limited, Sunnyvale, CA (US)

(72) Inventors: John William Peake, Mountain View, CA (US); Arthur F. Lange, Sunnyvale, CA (US)

(73) Assignee: Trimble Inc., Sunnyvale, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 13/797,352

(22) Filed: Mar. 12, 2013

(65) Prior Publication Data

US 2013/0191017 A1    Jul. 25, 2013

Related U.S. Application Data

(62) Division of application No. 12/590,907, filed on Nov. 16, 2009, now Pat. No. 8,655,536.

(51) Int. Cl.
*G01C 21/34* (2006.01)
*G05D 1/02* (2006.01)
*A01B 69/04* (2006.01)

(52) U.S. Cl.
CPC ............ *G01C 21/34* (2013.01); *A01B 69/008* (2013.01); *G05D 1/0227* (2013.01); *G05D 1/0278* (2013.01); *G05D 2201/0201* (2013.01)

(58) Field of Classification Search
CPC .... G05D 1/0272; G05D 1/027; G05D 1/0278; G05D 2201/0216; G05D 1/0255
USPC ... 701/25, 26, 41, 28, 31.4, 46, 45, 466, 50, 701/533; 356/4.01; 700/242
See application file for complete search history.

(56) References Cited

U.S. PATENT DOCUMENTS

| 5,156,219 | A | 10/1992 | Schmidt et al. |
| 5,369,589 | A | 11/1994 | Steiner |
| 5,390,125 | A | 2/1995 | Sennott et al. |
| 5,612,883 | A | 3/1997 | Shaffer et al. |
| 5,615,116 | A | 3/1997 | Gudat et al. |
| 5,684,696 | A | 11/1997 | Rao et al. |
| 5,956,250 | A | 9/1999 | Gudat et al. |
| 5,987,383 | A | 11/1999 | Keller et al. |
| 6,314,348 | B1 | 11/2001 | Winslow |
| 6,539,303 | B2 | 3/2003 | McClure et al. |
| 6,553,299 | B1 | 4/2003 | Keller et al. |
| 6,703,973 | B1 | 3/2004 | Nichols |
| 8,116,977 | B2 | 2/2012 | Aral et al. |
| 8,655,536 | B2 | 2/2014 | Peake et al. |
| 2002/0072850 | A1* | 6/2002 | McClure ............. A01B 69/008 701/25 |
| 2003/0187560 | A1 | 10/2003 | Keller et al. |

(Continued)

*Primary Examiner* — Jelani Smith
(74) *Attorney, Agent, or Firm* — Kilpatrick Townsend & Stockton LLP

(57) ABSTRACT

In an automatic vehicle position control system, such as a satellite-based agricultural implement steering system, the satellite-based steering information is adjusted with information obtained from one or more path sensors to facilitate the automatic nudging of the vehicle to take account of inaccurate tracking of the agricultural implement relative to its tractor, terrain variations, and inaccuracies in the satellite-based steering system.

9 Claims, 4 Drawing Sheets

(56) References Cited

U.S. PATENT DOCUMENTS

| | | |
|---|---|---|
| 2003/0187577 A1 | 10/2003 | McClure et al. |
| 2006/0178825 A1 | 8/2006 | Eglington et al. |
| 2007/0032950 A1* | 2/2007 | O'Flanagan et al. ......... 701/214 |
| 2009/0228166 A1* | 9/2009 | Durkos et al. .................. 701/26 |
| 2011/0118926 A1* | 5/2011 | Peake et al. .................... 701/25 |

* cited by examiner

METHOD AND SYSTEM FOR AUGMENTING A GUIDANCE SYSTEM WITH A PATH SENSOR

CROSS-REFERENCE TO RELATED U.S. APPLICATION

This application is a divisional application of and claims the benefit of co-pending U.S. patent application Ser. No. 12/590,907 filed on Nov. 16, 2009 entitled "A METHOD AND SYSTEM FOR AUGMENTING A GUIDANCE SYSTEM WITH A PATH SENSOR" by John Peake, and assigned to the assignee of the present application; the disclosure of which is hereby incorporated herein by reference in its entirety.

FIELD OF THE INVENTION

The invention relates to the automatic control of a vehicle or agriculture implement. In particular it relates to the automatic positioning of agricultural vehicles and or implements in order to facilitate the tracking along pre-defined or pre-existing paths.

BACKGROUND OF THE INVENTION

It is common in the field of agriculture to make use of automation systems to help steer tractors and other agricultural land-working vehicles such as harvesters, sprayers and their attached implements. All of these types of farm equipment are referred to hereinafter as "mobile agricultural machines." In the past, farm vehicles and guided implements have made use of sensors to help guide them along pre-defined or pre-existing swaths or rows. The swath width is the coverage width of the implement in use, and for crops planted in rows it is an integer multiple of the row spacing. These sensors, which will be referred to herein as path sensors, measure the offline distance of the vehicle or implement to the crop rows, ground furrows or edge of previously harvested crop swath using either contact sensors such as suspended weights or wands, or using non-contact sensors (laser, sonar, optical imaging). These locations determined by the path sensor are referred to as path reference points. Path sensors include sensors that measure distance to crop rows, either the plants themselves or ground features of the rows, such as ruts between the beds of the planted rows. In particular, swath sensors measure distance to the edge of a swath, such as the distance to the edge of the previously harvested adjacent swath. Thus, the path sensors include both row and swath sensors and typically sense physical features along a vehicle path such as furrows in the ground or crops along the sides of a swath.

One type of prior art furrow sensor is shown in FIG. 1 and comprises one or more weights 100 dragging on the bottom of the furrow under the farm vehicle or implement and connected to sensors that indicate when the weight is either on the left or right hand side of the centre of a furrow in a ploughed field. FIG. 2 shows an example of a swath sensor as known in the prior art, in this case defined by a contact sensor in the form of two wands 200 extending outwardly and arranged to brush against crops planted in proximity to the vehicle path. The magnitude of the deflection or relative deflection of adjacent sensors gives a measurement of the deviation from a reference line, e.g., as defined by a furrow, a row of crop stalks, etc. (the deviation from the reference line also being referred to herein as the offline distance of the vehicle/implement.). In the case of wand sensors, the peaks in the deflections can be used to make measurements to the crop stalks, by translating the peak measurement voltage into a peak deflection angle and thus into an offline distance. Similarly the relative deflections of weights arranged side-by-side, such as the weights 100 shown in FIG. 1 can be used to indicate the location of a vehicle or implement relative to a furrow.

The functioning of a path sensor is depicted generally by the adjustable arm sensors shown in FIGS. 3 to 5, which show a pair of pivotal arms 300 connected to sensors, and the resultant signal output in the form of right and left arm signal outputs 3010 when the vehicle is either correctly aligned relative to a desired path (FIG. 3) or deviates to the left or right (FIGS. 4 and 5, respectively).

One major problem is when there is a gap in the information from the path sensors, for instance due to a gap in the planted row of crops due to a failure of some of the seeds to germinate. In this situation the sensor is either unable to produce useful offline distance measurement for vehicle guidance or it simply produces erroneous measurements. Another problem when using the path sensors alone is that absolute position, heading and speed information is not available.

Another disadvantage of path sensors is that many of them have a limited measurement range and may be affected by the heading of the vehicle/implement relative to the path. This becomes particularly problematic when the vehicle has to steer to the next swath after a turn around from one swath to the next since the physical path references are typically interrupted at the ends of the fields.

A more recent approach to auto-control of agricultural vehicles is the use of Global Navigation Satellite Systems (GNSS) such as Global Positioning System (GPS), differential GPS (DGPS) or Real Time Kinematic (RTK) techniques, with or without inertial sensors. Differential GPS (DGPS) improves results over pure GPS by providing corrections to the GPS receiver that are used by the GPS receiver to improve the accuracy of the position fix. The corrections are generated at a reference station or a network of reference stations, and broadcast via Coast Guard transmitters or satellite transmitters as part of the Wide Area Augmentation Service of the Federal Aviation Administration. DGPS thus enables the GPS receiver to achieve a higher degree of accuracy (typically about 20 cm) than is possible with pure GPS, which is limited to an accuracy of about 4 meters. For even greater accuracy, Real Time Kinematic (RTK) techniques developed for the survey market are used. The RTK method enables the GNSS receiver to eliminate more errors that degrade the position accuracy of an uncorrected GNSS receiver system. The RTK method enables the GNSS receiver to calculate a vector distance (range and bearing) from a reference receiver, or from a chosen reference point. The latter point is referred to as a Virtual Reference Station. However, even these enhancements to GPS leave undesirably large errors when considering the size and separation of typical furrows in a prepared field.

In addition to above-mentioned errors or inaccuracies in the GNSS system, there are off-sets that are introduced due to mechanical shortcomings of the vehicles and implements, e.g., failure of a towed implement to correctly track the path of the tractor pulling it. These will be referred to as mis-registration. Thus even if all GNSS errors could be eliminated, the mis-registrations would introduce off-sets. For instance, it is common to find that fields have been prepared using manual systems, path sensor systems, or with towed implements which may drift with respect to the tractor due to field irregularities resulting in crop position shift. The result is that subsequent working of the field, such as harvesting or spraying with the use of a satellite control system such as RTK requires repeated manual interventions to take into account discrepancies in the actual path compared to the path defined by using the satellite system. In addition to mis-registrations and GNSS errors, physical characteristics of the land, e.g., obstructions such as trees or boulders, may force a vehicle path to deviate.

Four deviation conditions can be defined as a result of the above problems. These are illustrated in FIGS. 6 to 9. Typically a starting line A-B is defined, also referred to as a guidance path as shown in FIG. 6, which is then used as a reference for subsequent paths formed relative to the A-B reference as the farm vehicle moves back and forth across the field. FIG. 6 illustrates a varying width 600 between rows (which may have been caused by mis-registrations between tractor and plough at time of plowing or by errors in the GNSS measurements if a satellite system was originally used to define the rows). Therefore, subsequent working of the field using a satellite guidance system requires the driver to adjust or "nudge" the position of his vehicle at the start of each row.

FIG. 7 illustrates actual wavy row pattern e.g., due to geographic undulations, as indicated by reference numeral 700 compared to the ideal straight line 702. Instead, this may be caused where a field is actually be laid out with straight parallel paths to start with but due to GNSS errors on a satellite based system used in subsequent operations, the vehicle path defines a wavy pattern as indicated by the wavy lines 700.

Yet another deviation is indicated in FIG. 8, where the paths 800 veer outward or inward relative to each other rather than remaining parallel, thus defining a first order function.

FIG. 9 shows another condition requiring manual intervention. In this case an obstacle 900 such as a tree or boulder makes it necessary for the vehicle to divert from its preferred parallel path requiring the driver to make repeated adjustments on subsequent paths to take account of the diversion.

The present invention seeks to address the problems discussed above and thereby alleviate the impact on the driver. The present invention also seeks to reduce the cost of providing an auto steering solution.

SUMMARY OF THE INVENTION

According to embodiments of the invention there is provided a system for augmenting guidance information from an automatic guidance system in a mobile agricultural vehicle machine, comprising a position determination guidance sensor mounted on the mobile agricultural machine and configured to provide guidance information for controlling the steering direction of the machine along a guidance path, at least one path sensor mounted on the mobile agricultural machine for sensing the relative position of the mobile agricultural machine to at least one path reference point, and a processor configured to estimate augmented guidance information derived from the path sensor and the position determination guidance sensor. The estimation of augmented guidance information may include adding or subtracting distance information, adjusting bearing information, adding vector information or any other mathematical or computational technique that makes use of trigonometric calculations, look-up tables or other techniques to supplement guidance information from one source with additional data from another source.

The position determination guidance sensor may comprise a Global Navigation Satellite System (GNSS) receiver or an inertial measurement unit mounted on the agricultural vehicle or implement. The GNSS receiver may be augmented with an inertial measurement unit made up of one or more inertial sensors. The GNSS receiver may include at least one of a GPS, Galileo, GLONASS, Compass, and may make use of Satellite Based Augmentation Systems (SBAS) in a separate or as an integrated portion of the GNSS receiver. Thus, the GNSS receiver may include RTK or DGPS correction capabilities. The path sensor may sense one or more path markers and may include at least one of a wand sensor, a mechanical furrow sensor, a camera (e.g., a video camera or a CCD), an ultrasonic furrow sensor and a laser sensor, the path marker being any feature that can be detected by the path sensor relative to the vehicle or implement. The path marker may, for example, include plowed furrows, rows of crops, marker furrows formed by an agricultural implement, etc.

The system may further include a memory for storing positional or positional offset information from one or both of the GNSS/inertial measurement unit and the path sensors. The information from path sensors may be augmented by positional data measured or derived from adjacent paths or adjacent swaths. Calculations for path adjustments may include one or more of data from memory, data currently measured by one or more path sensors, and data from a GNSS/IMU. Calculations that may be made include equidistance calculations or other projections, or may include measurements from previous passes down the same swath. Typically the memory is connected to the processor.

Further, according to embodiments of the invention, there is provided a method for automatically guiding an agricultural vehicle or implement, comprising receiving GNSS positional information from one or more satellite systems, gathering secondary positional information from one or more path sensors, and augmenting or adjusting the GNSS positional information using the secondary positional information.

Typically, the vehicle or implement is guided along substantially adjacent paths defined in a demarcated field and the secondary positional information includes information gathered along the path that is currently being negotiated by the vehicle. Instead or in addition, the secondary positional information may include information gathered along one or more paths previously negotiated by the vehicle. The satellite system may include a one or more of a GPS, Galileo, GLONASS, Compass, and Satellite Based Augmentation System (SBAS) receiver. The path sensor may include at least one of a wand sensor, a row or furrow sensor, a camera (e.g. video camera, CCD, etc.), a sonar sensor, and a laser sensor.

The GNSS receiver measurements may, for example, be processed by RTK techniques or by DGPS techniques. The method may further include gathering manual positional correction information, and the correction information may include the manual positional correction information gathered during one or more paths previously negotiated by the vehicle.

The method may include ignoring information from the path sensors if it is determined from the GNSS/Inertial system that the sensors are not in the desired row of the swath and are sensing a neighboring row. This avoids the vehicle or agricultural implement from being "snapped" into the wrong row.

Instead of providing path control for the vehicle generally, e.g. by guiding the GNSS antenna location or the location of a fixed axle based on a GNSS signal, or guiding the vehicle or implement using path sensor signals, the method may include adjusting the guidance path or trajectory of multiple points that are independently steerable on the vehicle or agricultural implement by calculating the (x,y,z) offset or only the (x,y) offset relative to the antenna or relative to the path sensor.

DETAILED DESCRIPTION

In one embodiment the present invention provides a vehicle guidance system, also referred to herein as an auto-nudging system, which makes use of a satellite based vehicle position monitoring system to provide vehicle path information and additional sensors to augment the path information. As will become clearer below, the introduction of the additional sensors also has the effect of improving satellite-based measurements (GNSS) or Inertial Sensor measurements, thereby reducing the performance capability requirements of the GNSS receiver or sensor to be used for the GNSS or Inertial Sensor. Also by providing vehicle guidance with respect to manually planted fields more accurate results can be obtained than when using GNSS or an Inertial Sensor system (also referred to herein as a GNSS/Inertial movement unit or GNSS/IMU) alone.

Figure 13:
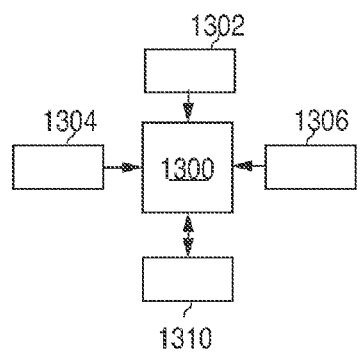
FIG. 13 shows a block diagram of one embodiment of a system of the invention.

One embodiment of such a system is shown as a block diagram in FIG. 13, in which a processor 1300 receives inputs from a GNSS receiver 1302, an IMU 1304 and one or more path sensors as depicted by block 1306. In this embodiment the calculations for adjusting the vehicle path are performed by the processor 1300. It will, however, be appreciated that the calculations could be done in the GNSS receiver, which has its own processing capabilities. In such an embodiment, the additional positional information from the IMU and path sensors would be fed into the GNSS receiver. In yet another embodiment, the processing could be performed in the IMU processor. In this embodiment, a memory 1310 is included for saving adjustment information or positional data, as will become clearer from the discussion below.

Inertial movement units (IMUs) or inertial sensors that are employed are typically of two types: rate-gyroscopes which measure the turn rate of a body around one or more axes, and accelerometers which measure acceleration in the direction of one or more axes. These can be combined using an algorithm such as a Kalman filter to produce position, velocity and attitude information more accurately than the GNSS receiver alone, and/or also project the GNSS information from the antenna position to another point on the vehicle/implement, compensating for antenna roll and pitch etc.

Figure 2:
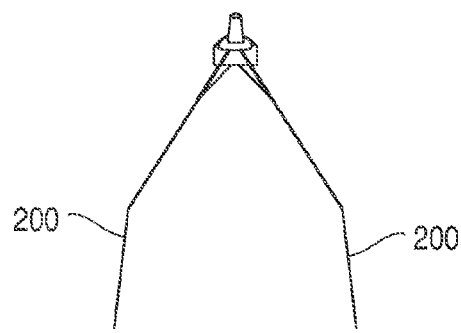
FIG. 2 is a side view of another type of prior art path sensor.
Figure 6:
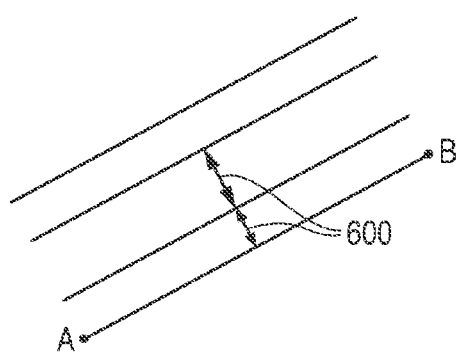
FIGS. 6-9 depict different types of path error conditions that may occur.
Figure 7:
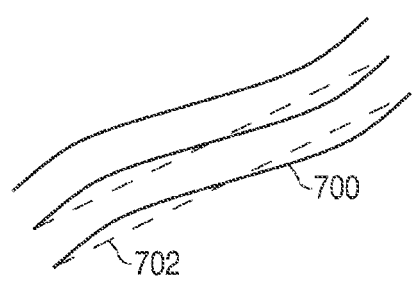
Figure 8:
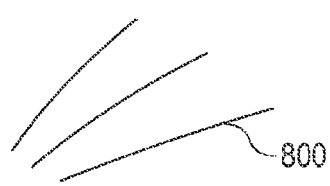
Figure 9:
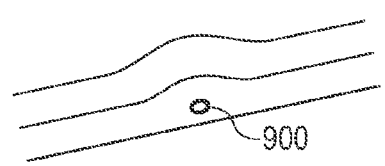
Figure 3:
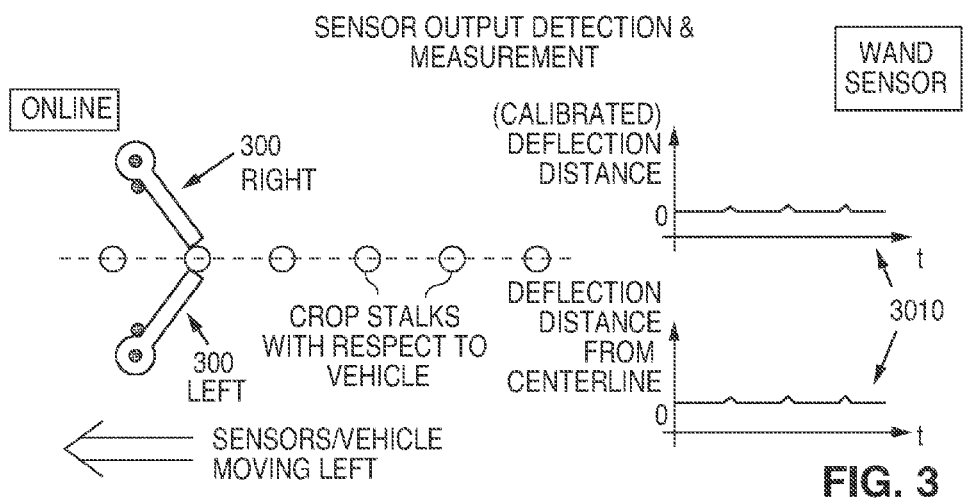
FIG. 3 is a depiction of a prior art pair of path sensor and signal output for showing correct path tracking.
Figure 4:
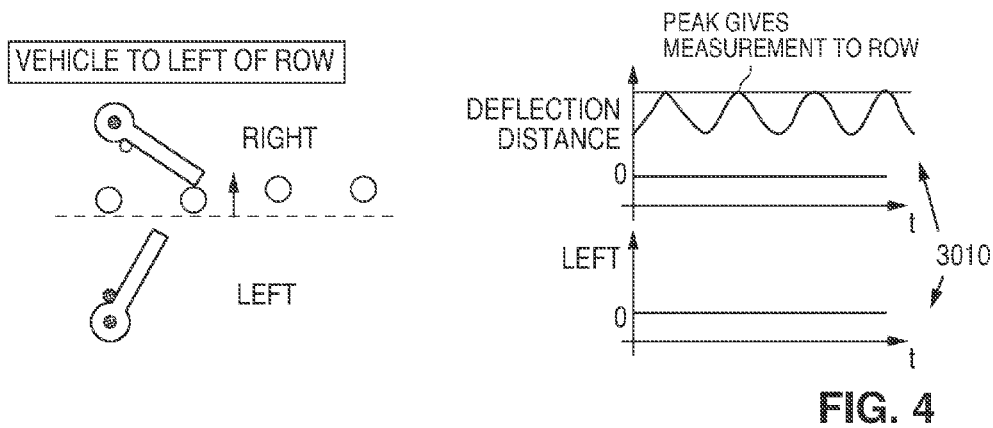
FIG. 4 is a depiction of the pair of path sensors of FIG. 3 and output signals when the vehicle veers to the left of the desired path.
Figure 5:
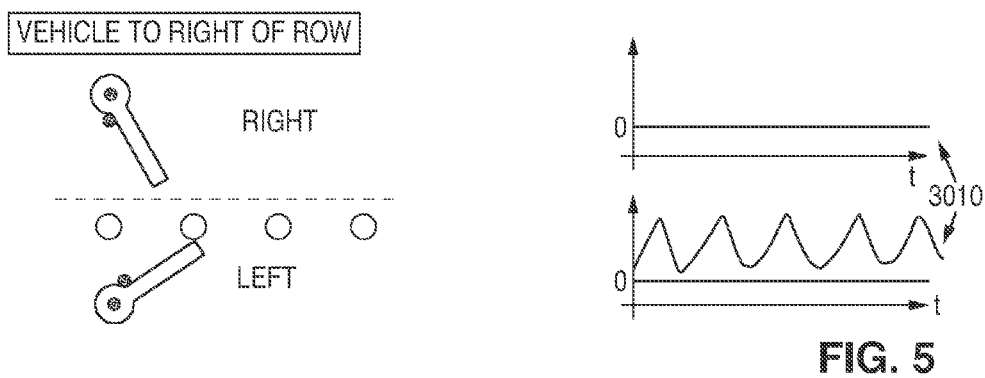
FIG. 5 is a depiction of the pair of path sensors of FIG. 3 and output signals when the vehicle veers to the right of the desired path typical path error condition.

In order to guide or auto-nudge the vehicle or agricultural implement, the present invention includes path sensors mounted on the vehicle or implement to provide additional vehicle/implement position information with respect to the desired path. In the case of pre-existing furrows in the ground that define the vehicle path, a furrow sensor as depicted in FIGS. 3-5 or a wand sensor such as the sensor 200 shown in FIG. 2 could be secured to the vehicle or implement in a conventional manner.

Figure 1:
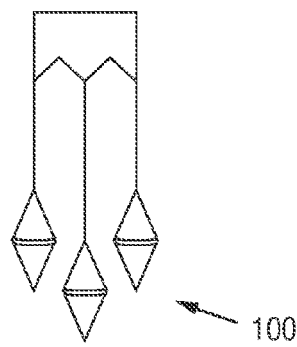
FIG. 1 is a top view of one type of prior art path sensor.

However, in one embodiment, instead of using the signals from the path sensors directly to make micro adjustments to the vehicle path, path sensor data may be gathered and stored in memory. An algorithm uses the signal information from one or more path sensors, that was previously gathered (during previous swaths or from previous passes down the same swath) to define a guidance path. This information is used to calculate any necessary path offsets (either perpendicular to the current guidance path or as an (xy) or east-north offset to the vehicle path based on additional path information. Thus, for instance, GNSS positional information from the satellite or data from an IMU is supplemented with path information that is currently gathered by one or more path sensors as well as path sensor information previously stored in memory. In one embodiment, where crops already exist along the vehicle path, wand sensors such as the sensors 100 shown in FIG. 1 could be used to provide the "nudging" information.

Similarly, other vehicle mounted sensors such as cameras, including video cameras and charge coupled devices (CCDs), laser detectors, ultra-sonic, sonar detectors or any other sensors or detectors that can be used to detect obstacles or detect the vehicle position relative to surrounding features, whether these features are furrows in the ground, crop rows, or any other path line reference. For ease of description these sensors will be referred to generally as path sensors and the information they provide will be referred to as "nudging" information or path adjustment information irrespective of the kind of technology used and irrespective of whether the "nudging" information causes the vehicle or implement to make a positional change relative to the satellite-based positional information. Thus, insofar as the path sensor information detects no deviation from the desired path, its feedback signals will not cause the vehicle to be "nudged" or path corrected.

On the other hand once the path sensor detects an obstacle or a deviation, its signal information will be used to adjust the vehicle path as it is defined by the GNSS information or Inertial Sensor information. Previously stored path information, for instance guidance path information, may be included in the calculations to determine nudging information or path off-sets.

It will also be appreciated that the invention is not limited to the use of only one path sensor but may include a number of different types of path sensors. One sensor or multiple sensors or all of the sensors may provide "nudging" information at any one time. Even if some of the path sensors are not required, e.g., wand sensors when there are no crops to brush against, the sensors may for practical reasons be physically connected to the vehicle for subsequent use when the crops do exist, e.g., for later spraying or harvesting. In such a case, switches may be included to the sensor power supply for the sensors that are not in use to reduce power consumption, or the signal may simply be interrupted e.g., using a switch or by tri-stating the signal line to avoid unwanted interference from the unused path sensors, or the signals may be fed through a multiplexer to allow only the signals of interest to be monitored.

In one embodiment, the system includes a memory device which allows either all of the "nudging" information from the path sensors to be stored for a certain task (e.g., information is gathered from the beginning of a task such as the harvesting of a field, or for a predefined period of time, or until the memory is full, whereafter information is overwritten on a first-in-first-out basis) or for only the previous path negotiated by the vehicle, in order to provide data for making path adjustments. Calculations for adjusting the path of the vehicle or implement (nudging information) can also involve providing point corrections for each path measurement or may involve offsetting an entire path by providing revised guidance path information.

It will be appreciated, therefore, that the data stored in memory allows not only the adjustment of an entire path but also provides additional sources of information. Thus it allows the revised guidance path information subsequently to be fed back into the system to permit a correction of the satellite-based positional information based on earlier path information in a similar way to the information gathered in real time by the path sensors for a current path. For example, if a boulder is detected in the path of the vehicle, this information is available to the vehicle on the way back along the adjacent path, thereby allowing both current and past corrections to be used to automatically adjust or "nudge" the vehicle. The information can also be stored long-term so that it is available for future use, i.e., during subsequent farming operations.

In yet another embodiment manual interventions or "nudging" by the driver is stored in memory for use in subsequent paths or subsequent farming operations. The invention is therefore not limited to data gathered by path sensors but includes manual correction information by the driver or controller of the vehicle or implement, to provide nudging information.

Figure 10:
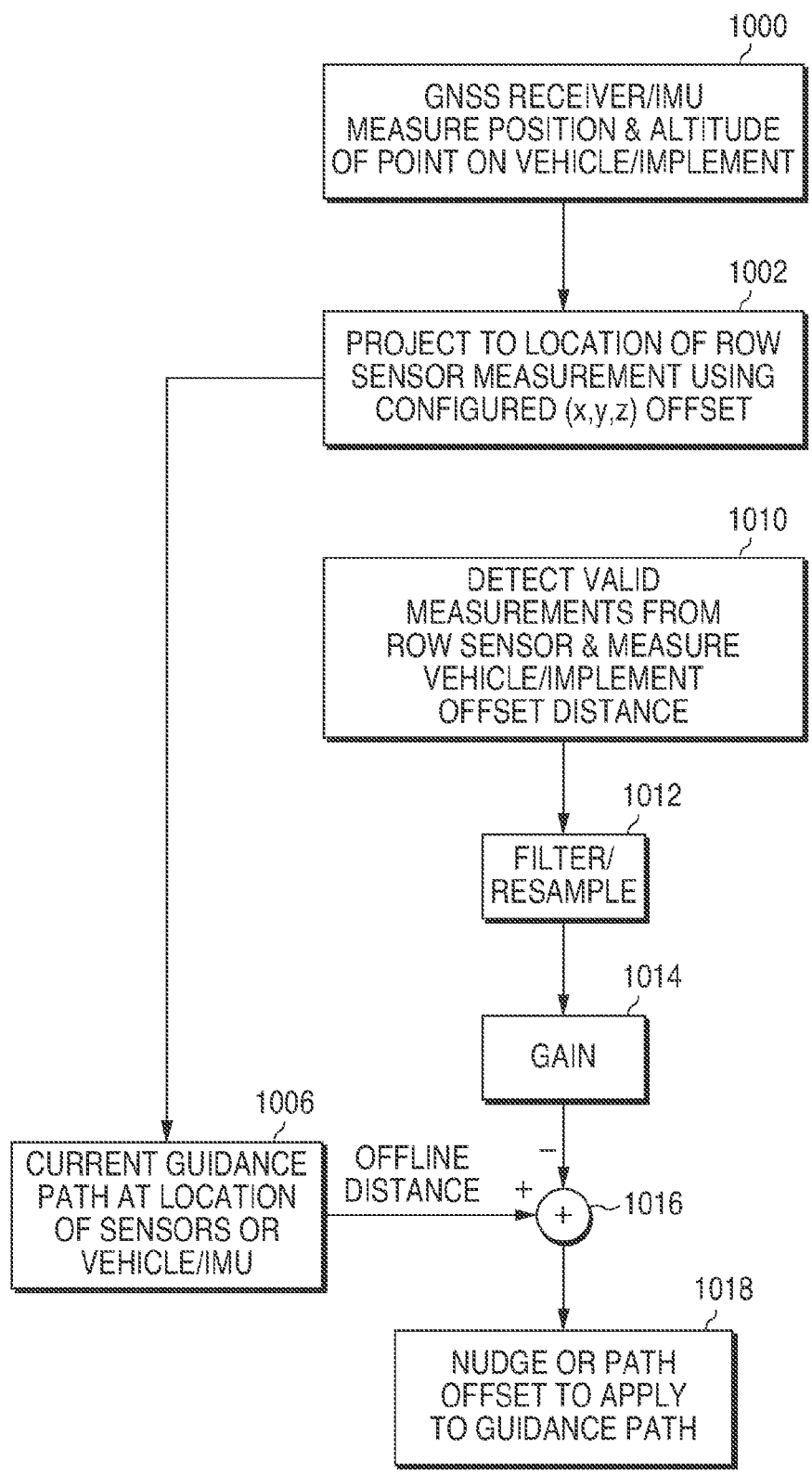
FIG. 10 is a flow diagram of one embodiment of the logic involved in correcting satellite-based directional information in accordance with the invention.

FIG. 10 shows a flow chart depicting the logic involved in one embodiment of an algorithm that combines satellite-based positional information or information from an inertial movement unit (IMU) with "nudging" information from a path sensor. A GNSS or inertial measurement unit is used to measure the position and attitude of the vehicle or of the agricultural implement (Step 1000) and is projected trigonometrically to the location of a path sensor using an (x,y,z) off-set as depicted by Step 1002.

This is used to define the guidance path of the vehicle at the location of the row sensors (Step 1004). In addition, according to the invention, path sensor measurements are made at Step 1010 using a path sensor, e.g., a wand sensor, which monitors wand movement and in this embodiment does peak measurements by monitoring maximum deflections of the wand. The signal from the path sensor is optionally filtered and sampled (Step 1012) and amplified (Step 1014). In one embodiment the signal from the sensor is buffered using a voltage follower before being passed through a low pass filter and then converted to digital form using an analog-to-digital converter that samples the analog signal at 50 Hz.

The resultant signal is compared to the data from the GNSS/IMU and the difference calculated at Step 1016. The result is used to nudge the vehicle or adjust its path to compensate for deviations as depicted by Step 1018. This vehicle path adjustment may be an adjustment amount perpendicular to the vehicle path or may be a set of (x,y,z) parameters to adjust the vehicle position.

Figure 11:
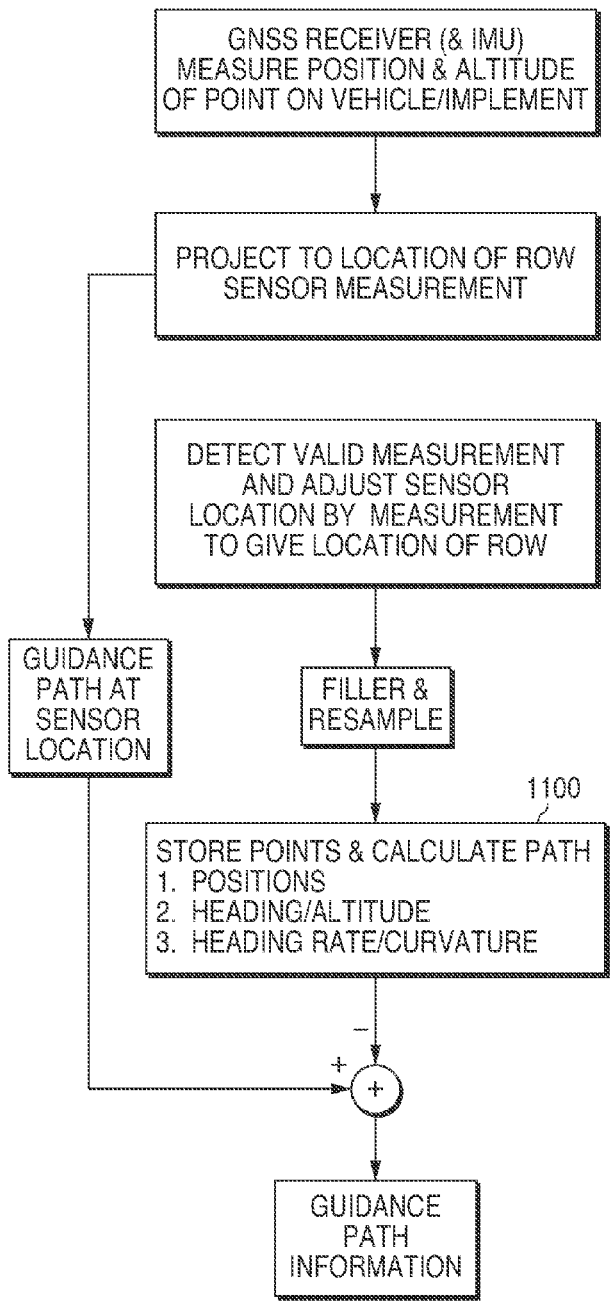
FIG. 11 is a flow diagram of another embodiment of the logic involved in correcting satellite-based directional information in accordance with the invention.
Figure 12:
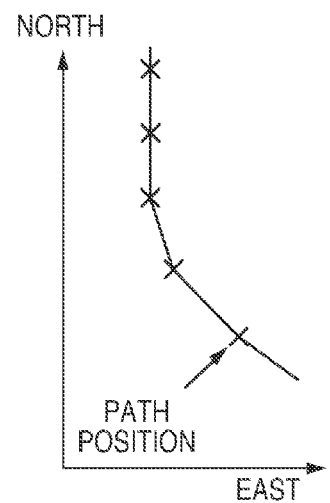
FIG. 12 shows a plot of path information as gathered by a path sensor.

In another embodiment, shown in FIG. 11, the operations are essentially the same as in FIG. 10 except that the path sensor is used to collect multiple samples, e.g., a sample every 1 meter or every 0.2 seconds. The sample data is stored in memory and path calculations made, including the positions of the vehicle over time, the heading, the attitude, the heading rate and the curvature, as depicted by the step 1100. This provides path information (Step 1102), which is graphically represented in FIG. 12 to show the vehicle path in a north-east plane.

Thus, the approach of the FIG. 11 embodiment comprises defining a vehicle path based on multiple measurements over time using path sensor information that is gathered and stored in memory, and using the path information to adjust the path that was obtained using GNSS/Inertial Measurement Unit information.

Thus, the path sensor signal is compared to the satellite-based information for what is meant to be the same location to determine whether a position change or "nudge" is required to adjust the satellite-based information. In addition "nudging" information previously obtained from the path sensors or the driver and stored in memory from one or more previous runs may be used to define an updated guidance path or may be included together with GNSS/IMU information to calculate nudging information. Insofar as a direction change or nudge is required the direction and magnitude of the change is calculated based on the amount of deflection of the path sensor and reformulated into a direction correction signal output.

In one embodiment three sources of information are compared: the previously stored path data (obtained either from the path sensors or from manual intervention by the driver), the information obtained by GNSS/IMU, and new path data that is gathered in real time during a run. It will be appreciated that insofar as more than one path sensor provides "nudging" information that impacts the direction, or information from the memory impacts the direction, the algorithm that calculates the path adjustment may be configured in different ways to either give precedence to one sensor over another or, in another embodiment to simply adopt the maximum direction change if the various sources of secondary information agree as to the direction.

In a simplified embodiment path sensors may be included that only indicate path deviations but not obstacles in the path, thus leaving the correction for obstacles as a manual "nudge" to be performed by the driver of the vehicle. In yet another embodiment the sensors may be limited to detecting obstacles, leaving the path corrections due to path deviations to the driver.

While the invention has been described with respect to a few specific sensors and with reference to a specific algorithm, the invention is not limited to these embodiments but includes all variations that fall within the ambit of the invention as defined by the claims.

What is claimed is:

1. A system for augmenting guidance information from an automatic guidance system in a mobile agricultural machine, comprising:
    a position determination guidance sensor mounted on the mobile agricultural machine and configured to provide guidance information for controlling a steering direction of the mobile agricultural machine along a guidance path;
    at least one contact-based path sensor mounted on the mobile agricultural machine for physically sensing a relative position of the mobile agricultural machine to at least one path reference point;
    a memory for storing the guidance information from the position determination guidance sensor and the relative position of the mobile agricultural machine from the at least one contact-based path sensor; and
    a processor connected to the memory, wherein the processor is configured to determine corrected guidance information based on a difference between the guidance information from the position determination guidance sensor and the relative position of the mobile agricultural machine from the at least one contact-based path sensor stored in the memory.

2. A method for augmenting guidance information from an automatic guidance system in a mobile agricultural machine, comprising:
    determining the guidance information of the mobile agricultural machine using a position determination guidance sensor and deriving guidance information therefrom;
    obtaining secondary positional information from at least one contact-based path sensor configured to physically detect a path reference point; and
    adjusting the guidance information from said position determination guidance sensor using the secondary positional information to define augmented guidance information, wherein the mobile agricultural machine is guided along substantially adjacent paths defined in a demarcated field and the secondary positional information includes information gathered along a path that is currently being traveled by the mobile agricultural machine, and wherein the secondary positional information includes information gathered along one or more paths previously traveled by the mobile agricultural machine.

3. A method for augmenting guidance information from an automatic guidance system in a mobile agricultural machine, comprising:
    determining the guidance information of the mobile agricultural machine using a position determination guidance sensor and deriving guidance information therefrom;
    obtaining secondary positional information from at least one contact-based path sensor configured to physically detect a path reference point;
    determining corrected guidance information based on a difference between the guidance information and the secondary position information;
    adjusting the guidance information from said position determination guidance sensor using the corrected guidance information; and
    gathering manual positional adjustment information.

4. The method of claim 3, wherein the adjustment of the position determination guidance sensor positional information includes the manual positional adjustment information gathered during one or more paths previously traveled by the mobile agricultural machine.

5. The system of claim 1, wherein the at least one contact-based path sensor comprises a swath sensor for measuring a distance to an edge of a swath.

6. The system of claim 1, wherein the at least one contact-based path sensor further comprises a row sensor for measuring a distance to a crop row.

7. The system of claim 1, wherein the at least one reference point is a ground feature of a row, wherein the at least one contact-based path sensor comprises a row sensor for measuring a distance to the ground feature of the row.

8. The system of claim 7, wherein the ground feature of the row comprises a rut between a bed of planted rows.

9. The system of claim 1, wherein the at least one reference point is a plant, wherein the at least one contact-based path sensor measures a distance to the plant.

* * * * *